US009003805B2

(12) United States Patent
Hernandez et al.

(10) Patent No.: US 9,003,805 B2
(45) Date of Patent: Apr. 14, 2015

(54) TURBINE ENGINE WITH DIFFUSER

(75) Inventors: Didier Hippolyte Hernandez, Quiers (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 1008 days.

(21) Appl. No.: 12/993,949

(22) PCT Filed: May 20, 2009

(86) PCT No.: PCT/FR2009/050941
§ 371 (c)(1),
(2), (4) Date: Nov. 22, 2010

(87) PCT Pub. No.: WO2009/153480
PCT Pub. Date: Dec. 23, 2009

(65) Prior Publication Data
US 2011/0097204 A1 Apr. 28, 2011

(30) Foreign Application Priority Data

May 22, 2008 (FR) ...................................... 08 53326

(51) Int. Cl.
*F04D 29/44* (2006.01)
*F02C 3/08* (2006.01)
*F01D 9/04* (2006.01)
*F01D 25/24* (2006.01)

(52) U.S. Cl.
CPC . *F02C 3/08* (2013.01); *F01D 9/045* (2013.01); *F01D 25/246* (2013.01); *F04D 29/444* (2013.01); *Y02T 50/67* (2013.01); *Y02T 50/671* (2013.01); *F05D 2230/90* (2013.01)

(58) Field of Classification Search
USPC ........................................................... 60/751
See application file for complete search history.

(56) References Cited

U.S. PATENT DOCUMENTS

| 4,264,272 | A | * | 4/1981 | Weiler ........................... 415/175 |
| 4,349,313 | A | * | 9/1982 | Munroe et al. .............. 415/173.4 |
| 4,854,126 | A | * | 8/1989 | Chevis et al. .................... 60/726 |
| 5,472,315 | A | | 12/1995 | Alexander et al. |
| 5,555,721 | A | | 9/1996 | Bourneuf et al. |
| 6,220,234 | B1 | * | 4/2001 | Baker et al. ...................... 60/751 |
| 6,279,322 | B1 | | 8/2001 | Moussa |
| 7,549,294 | B2 | | 6/2009 | Buret et al. |

(Continued)

FOREIGN PATENT DOCUMENTS

WO         01 18404         3/2001

OTHER PUBLICATIONS

International Search Report issued Dec. 11, 2009 in PCT/FR09/050941filed May 20, 2009.

*Primary Examiner* — Ted Kim
(74) *Attorney, Agent, or Firm* — Oblon, McClelland, Maier & Neustadt, L.L.P.

(57) ABSTRACT

A turbomachine including an annular combustion chamber; a centrifugal compressor; an annular diffuser with a radially oriented upstream portion presenting diffusion passages connected to the outlet of the compressor; a curved intermediate portion; and a downstream portion having a series of circularly spaced-apart deflector vanes. The turbomachine also includes an outer casing externally surrounding the combustion chamber and the downstream portion. The zone of the outer casing that is situated facing the deflector vanes is covered in a coating of abradable material, and the flow passage through the downstream portion is defined on the outside by the outer casing and by the coating.

10 Claims, 5 Drawing Sheets

(56) References Cited

U.S. PATENT DOCUMENTS

| | | |
|---|---|---|
| 7,581,397 B2* | 9/2009 | Strangman et al. ............. 60/751 |
| 2002/0098391 A1* | 7/2002 | Tanaka et al. ................. 428/697 |
| 2008/0233278 A1* | 9/2008 | Hopkins ....................... 427/142 |
| 2009/0214333 A1* | 8/2009 | Hernandez et al. ........... 415/203 |
| 2010/0031663 A1 | 2/2010 | Commaret et al. |
| 2011/0041494 A1* | 2/2011 | Parker et al. ...................... 415/9 |
| 2012/0315492 A1* | 12/2012 | Pujari et al. ................... 428/446 |

* cited by examiner

TURBINE ENGINE WITH DIFFUSER

BACKGROUND OF THE INVENTION

1. Field of the Invention

The invention relates to a turbomachine. It is applicable to any type of turbomachine for use on land or in aviation, and more particularly is applicable to airplane turbojets.

In the present description, "upstream" and "downstream" are defined relative to the normal flow direction of gas (from upstream to downstream) through the turbomachine. Furthermore, the "axis" of the turbomachine is the axis of rotation of the rotor of the turbomachine. The "axial direction" corresponds to the axial direction of the turbomachine, and a "radial direction" is any direction perpendicular to said axis. Similarly, an "axial plane" is any plane containing the axis of the turbomachine, and a "radial plane" is any plane perpendicular to said axis. Finally, unless specified to the contrary, the adjectives "inner" and "outer" are used relative to a radial direction such that an inner (i.e. radially inner) portion or face of an element is closer to the axis of the turbomachine than is an outer (i.e. radially outer) portion or face of the same element.

The invention relates to a turbomachine of the type comprising:
an annular combustion chamber;
a centrifugal compressor;
an annular diffuser serving to diffuse the gas stream leaving the compressor and to direct this gas stream towards the combustion chamber, the diffuser comprising: a radially oriented upstream portion presenting diffusion passages connected to the outlet of the compressor; a curved intermediate portion; and a downstream portion having a series of circularly spaced-apart deflector vanes; and
an outer casing externally surrounding the combustion chamber and the downstream portion.

2. Description of the Related Art

In general, a centrifugal compressor comprises a centrifugal impeller that serves to accelerate the gas passing therethrough and thus to increase the kinetic energy of said gas.

An annular diffuser defines an annular space surrounding the outside of the compressor, downstream therefrom. The diffuser serves to slow down the speed of the gas leaving the compressor, and as a result to increase its static pressure. Diffusers may be of the vane type or of the duct type.

These two types of diffuser comprise a radially-oriented annular upstream portion that presents a series of diffusion passages connected to the outlet from the compressor in order to recover the accelerated gas leaving it. These diffusion passages are of diverging section that increases progressively going outwards so as to diffuse the flow of gas leaving the compressor. Vane type diffusers use a series of circularly spaced-apart diffusion vanes that form diffusion passages between one another. In duct type diffusers, the diffusion passages are constituted by duct or pipe elements.

Downstream from said upstream portion, diffusers have an intermediate portion that is curved so as to curve the flow path through the diffuser and direct the flow of gas towards the combustion chamber.

Downstream from this intermediate portion, diffusers have an annular downstream portion comprising a series of circularly spaced-apart deflector vanes serving to deflect the flow of gas and thus reduce the gyration of the flow of gas leaving the diffusion passages, before said flow enters into the combustion chamber.

FIGS. 1 and 2 show a known example of a turbomachine of the above-outlined type comprising, in the gas flow direction:
a centrifugal compressor 110, an annular diffuser 120 having deflector vanes 123, and an annular combustion chamber 140. An outer casing 132 surrounds the outside of the combustion chamber 140 and the diffuser 120.

The diffuser 120 comprises: a radially-oriented upstream portion 121 that presents diffusion passages 122; a curved intermediate portion 124; and a downstream portion 125 having a series of circularly spaced-apart deflector vanes 126.

The flow passage is defined as being the envelope defining the space in which the gas flows, i.e. where the gas stream passes.

The flow passage through the upstream and intermediate portions 121 and 124 is defined between a first cheekplate 127 and a second cheekplate 128. The flow passage through the downstream portion 126 is defined on the inside by the first cheekplate 127 and on the outside by an outer bushing 129.

The downstream portion 125 of the diffuser is oriented parallel to the axis A of the turbomachine. In other words, in a section plane containing the axis A of the turbomachine, the mean axis M of the flow passage at the outlet from the downstream portion 125 of the diffuser is parallel to the axis A of the turbomachine. In this configuration, the main gas flow leaving the diffuser bypasses the combustion chamber 140 on the outside.

In order to ensure that the main gas flow leaving the diffuser 120 is directed towards the combustion chamber 140, thereby feeding the combustion chamber better with gas, and in an alternative that is not shown, the downstream portion 125 of the diffuser may be inclined relative to the axis A of the turbomachine so as to be oriented towards the combustion chamber 140. In other words, in a section plane containing the axis A of the turbomachine, the mean axis M of the flow passage at the outlet from the downstream portion 125 of the diffuser forms a non-zero acute angle relative to the axis A.

The drawbacks of known diffusers stem from the fact that the parts from which they are made are difficult to assemble together. In particular, when the downstream portion 125 is inclined relative to the axis A, it is particularly difficult to fasten the outer bushing 129 onto the downstream portion 125 by brazing or by crimping, since the outside surface of the downstream portion 125 is conical, so the outer bushing 129 tends to slide towards the free end of the downstream portion 126.

BRIEF SUMMARY OF THE INVENTION

It is therefore sought to propose a turbomachine of the above-specified type that has a diffuser that is easier to assemble than prior art diffusers.

This object is achieved by a turbomachine comprising:
an annular combustion chamber;
a centrifugal compressor;
an annular diffuser serving to diffuse the gas stream leaving the compressor and to direct this gas stream towards the combustion chamber, the diffuser comprising: a radially oriented upstream portion presenting diffusion passages connected to the outlet of the compressor; a curved intermediate portion; and a downstream portion having a series of circularly spaced-apart deflector vanes; and
an outer casing externally surrounding the combustion chamber and the downstream portion;
wherein the zone of the outer casing that is situated facing the deflector vanes is covered in a coating of abradable material, and wherein the flow passage through the downstream portion is defined on the outside by the outer casing and by said coating.

Thus, the outer casing and the coating are used to form the outer wall of the downstream portion. Consequently, the outer bushing that is usually used is omitted, thereby avoiding problems associated with fastening that bushing. In addition, omitting the outer bushing generally makes it possible to reduce the weight of the diffuser.

Said coating of abradable material serves to protect the casing, since a coating of this type is capable of deforming so as to damp the mechanical stresses exerted by the vanes on the casing, which stresses are due to differences of expansion between the vanes and the casing.

Furthermore, this type of coating is capable of deforming elastically in the operating temperature range of the diffuser, and thus of returning to its original shape when the vanes move away from the casing, thus making it possible to limit the clearance (and thus air leakage) that might exist between the tips of the vanes and the coating. For example, when the diffuser forms part of a two-spool bypass airplane turbojet, its operating temperature lies in the range 500° C. to 700° C.

Finally, said coating wears in preference to the vanes.

In an embodiment, said coating of abradable material is made of a polymer or of a metal alloy. It may be deposited on the casing in various ways, and in particular by molding, by sintering, by brazing, or by thermal sputtering. Since the techniques for depositing abradable materials are well known from elsewhere, they are not described in greater detail here.

In an embodiment, said coating is made of a material selected from: a mineral-filled epoxy abradable material; an aluminum, silicon, and non-fused polyester abradable material; and a cobalt-nickel-chromium-aluminum-yttrium-polyester and boron nitride abradable material.

These abradable materials are found to be well adapted for use in a two-spool bypass airplane turbojet with a casing made of aviation superalloy, in particular a superalloy based on Ni (e.g. a superalloy of the Inconel 718 (registered trademark) type), and with blades made of aviation steel (e.g. a 40CDV12 steel).

In an embodiment, the deflector vanes present respective free outer ends, i.e. they are not fastened to the outer casing nor to the coating, thereby further simplifying assembly of the diffuser.

In an embodiment, clearance is provided when cold between the tips of the deflector vanes and the coating. When hot, while the turbomachine is in operation, the clearance between the vanes and the coating decreases as a result of differences of expansion between the vanes and the casing. When designing the turbomachine, it is ensured that the clearance when cold between the tips of the vanes and the coating is optimized so that while the turbomachine is in operation, and in particular under cruising conditions (i.e. the normal operating speed after starting), the clearance while hot becomes zero or slightly negative so as to guarantee sealing between the tips of the vanes and the coating (i.e. avoid leaks of air) and so as to ensure that the vanes bear dynamically against the coating, but without that giving rise to mechanical stresses that are too great between the vanes and the casing. The presence of said coating on the casing also makes it possible to damp such stresses, as explained above. It is therefore appropriate to provide for cold clearance to be optimized so that a good compromise is obtained, in particular at cruising speed, between gastightness, dynamic thrust, and mechanical stresses.

In an embodiment, the outer casing presents a shoulder against which the outer downstream edge of the intermediate portion comes into abutment. By means of this shoulder, the intermediate portion is correctly and easily positioned relative to the casing. This makes the diffuser even easier to assemble.

BRIEF DESCRIPTION OF THE SEVERAL VIEWS OF THE DRAWINGS

The invention and its advantages can be better understood on reading the following detailed description of embodiments of the invention given by way of non-limiting illustration. The description refers to the accompanying figures, in which:

FIGS. 1 and 2 show the prior art and they are described above.

DETAILED DESCRIPTION OF THE INVENTION

Figure 1:
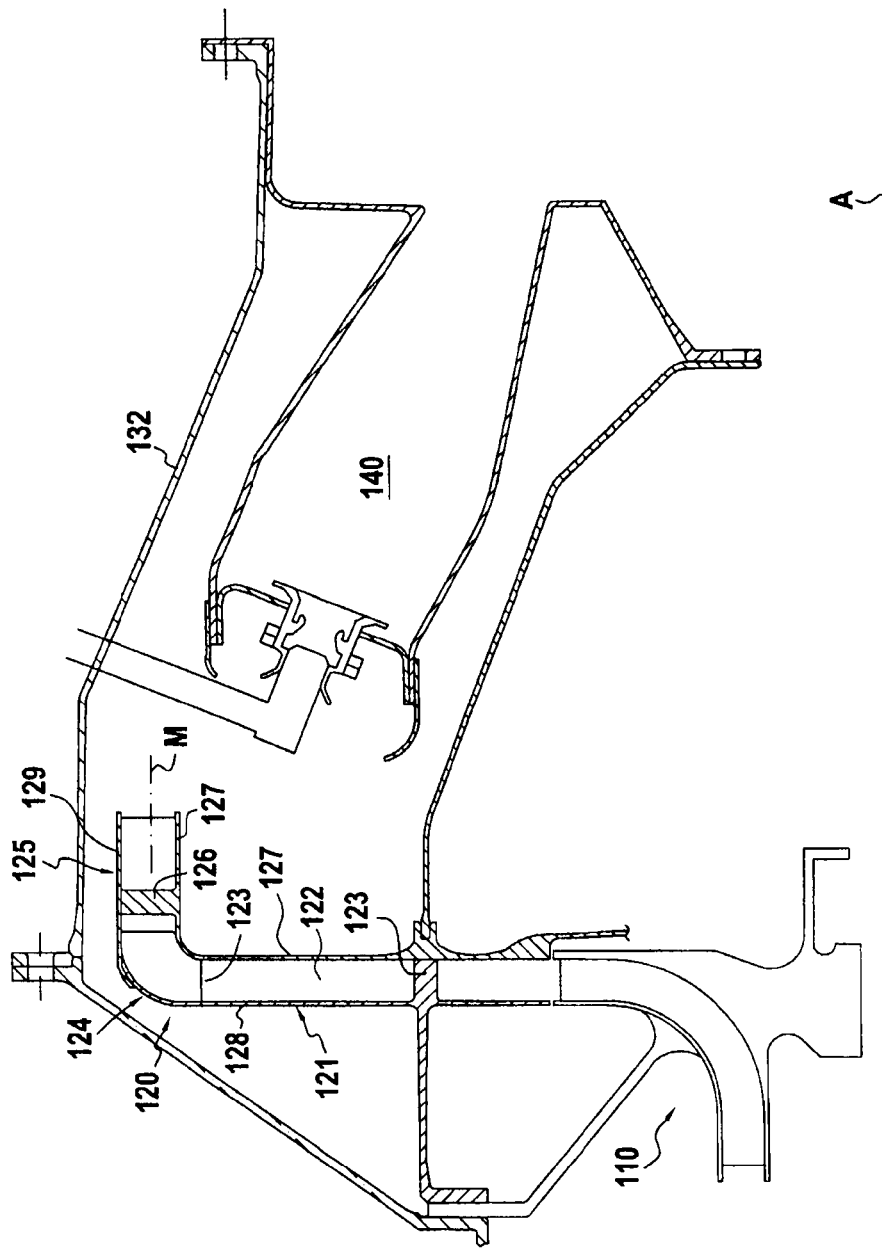
FIG. 1 is a diagrammatic axial half-section showing the compressor, the diffuser, and the combustion chamber module in a known example of an airplane turbojet.
Figure 2:
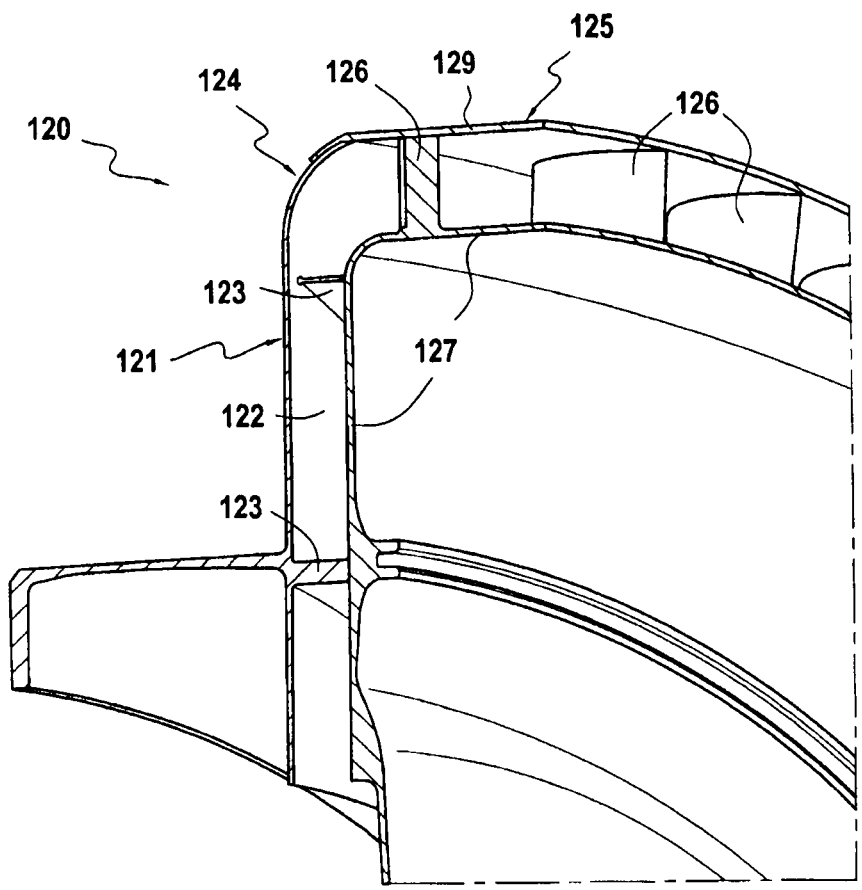
FIG. 2 is a perspective view of the FIG. 1 diffuser.
Figure 3:
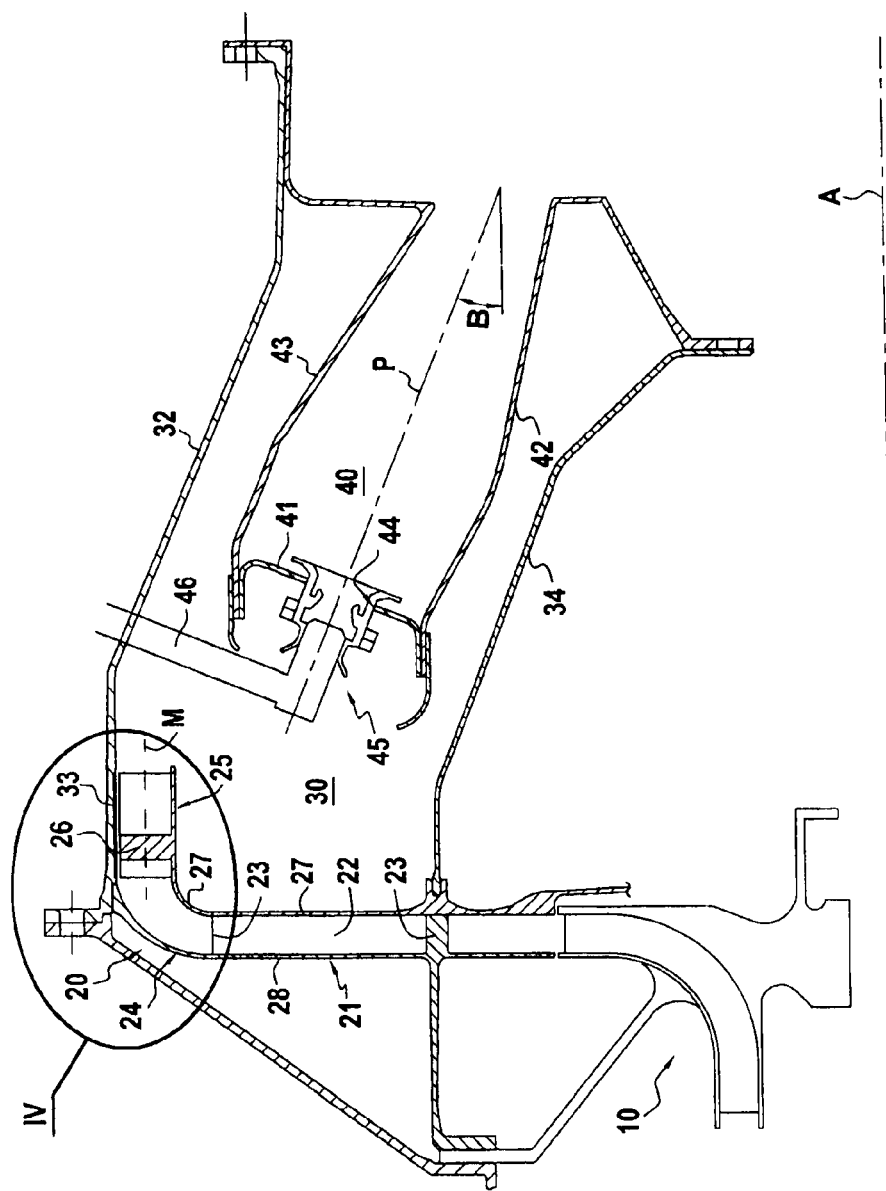
FIG. 3 is a diagrammatic axial half-section showing the compressor, the diffuser, and the combustion chamber module of an example of an airplane turbojet in accordance with the invention.

FIG. 3 shows a portion of an example turbomachine of the invention. More particularly, the turbomachine is an airplane turbojet. The gas passing through the turbojet is air.

The turbojet includes a centrifugal high pressure compressor 10, and an annular diffuser 20 connected downstream from the compressor 10, said diffuser opening out into a space 30 surrounding an annular combustion chamber 40. The space 30 is defined by an outer casing 32 and a concentric inner casing 34. The combustion chamber 40 is supported by fastener flanges connected to the casings 32 and 34.

The centrifugal compressor 10 comprises a centrifugal impeller. The impeller comprises a series of moving blades that are driven in rotation. These blades receive air axially, accelerate it, and release it radially into the diffuser 20.

The diffuser 20 presents an annular space surrounding the compressor 10. The diffuser 20 serves to reduce the speed of the air leaving the compressor 10 and as a result to increase its static pressure. The diffuser 20 shown in the figures is of the vane type.

The diffuser 20 has an annular upstream portion 21 oriented radially that presents a series of diffusion passages 22 connected to the outlet of the compressor 10 in order to recover the accelerated air leaving the compressor 10. These diffusion passages 22 are of section that increases progressively in the radial direction going from the inside towards the outside, so as to diffuse the stream of gas leaving the compressor 10. These diffusion passages 22 are formed by a series of circularly spaced-apart diffusion vanes 23. At the inlet to the upstream portion 21, these vanes 23 are close together. These diffusion vanes 23 become spaced further apart from one another circumferentially as they come closer to the outlet from the upstream portion 21.

Downstream from the upstream portion 21, the diffuser 20 has a curved annular intermediate portion 24 for curving the flow path of the diffuser and directly the flow of air towards the combustion chamber 40.

Downstream from this intermediate portion 24, the diffuser 20 includes an annular downstream portion 25 comprising a series of circularly spaced-apart deflector vanes 26 for reducing the gyration of the gas flow leaving the diffusion passages 22 before the gas flow enters into the space 30.

A first cheekplate 27 forms the inside wall of the downstream portion 25 such that the passage for the flow in the downstream portion 25 is defined on the inside by the first cheekplate 27. This cheekplate 27 carries the deflector vanes 26 (i.e. the vanes 26 are secured to the cheekplate 27).

The walls opposite the upstream and intermediate portions 21 and 24 are formed by the first cheekplate 27, and by a second cheekplate 28. Thus, the first and second cheekplates 27 and 28 define the flow passage in the upstream and intermediate portions 21 and 24. The first and second cheekplates 27 and 28 are parts that are separate from the outer casing 32.

The second cheekplate 28 carries the diffuser vanes 23 and when the diffuser 20 is assembled, the first cheekplate 27 is brazed to the diffuser vanes 23.

The combustion chamber 40 has an annular inner wall 42, an annular outer wall 43, and an annular chamber end wall 41 disposed between said inner and outer walls 42 and 43 in the upstream region of said chamber. The chamber end wall 41 presents injection orifices 44 that are circularly distributed around the axis X. Injector systems 45 are mounted on the chamber end wall, passing through said injection orifices 44 (there being one injector system 45 per injection orifice 44). These injector systems 45 serve to inject the air/fuel mixture that is burnt in the combustion chamber 40. The fuel for this mixture is delivered to the injector systems 45 by respective fuel feed pipes 46 that pass through the space 30.

The combustion chamber 40 (i.e. the main axis P of said chamber) is inclined relative to the axis A of the turbojet at a non-zero acute angle B. The greater this acute angle B the smaller the axial extent of the combustion chamber.

In the example of FIG. 3, the downstream portion 25 of the diffuser is oriented axially in the sense that the mean axis M of the flow passage at the outlet from the downstream portion 25 of the diffuser is parallel to the axis A.

The outer casing 32 is disposed radially outside the combustion chamber 40 and the downstream portion 25 of the diffuser 20.

The zone of the outer casing 32 situated in register with the deflector vanes 26 is covered by a coating 33 of abradable material.

The outer casing 32 and its coating 33 form the outer wall of the downstream portion 25, such that they define the outside of the air flow passage through said downstream portion 25. More precisely, the inside faces of the coating 33 and of the outer casing 32 define this passage.

Figure 4:
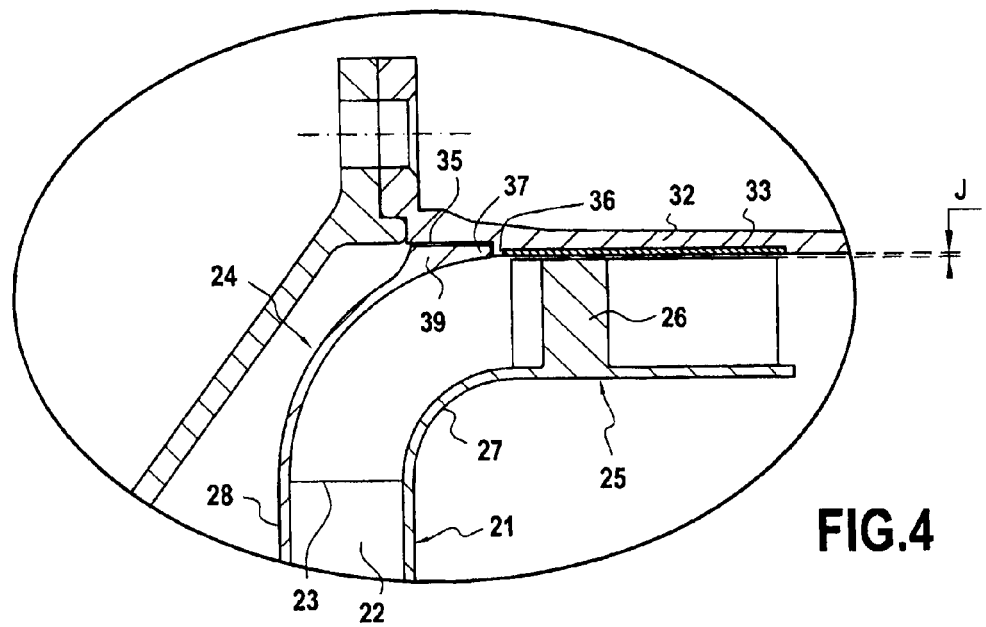
FIG. 4 shows a detail of the FIG. 3 diffuser.

As shown in detail in FIG. 4, the deflector vanes 26 are fastened neither to the outer casing 32 nor to the coating 33.

When cold, clearance J exists between the deflector vanes 26 and the coating 33. This clearance J decreases as the turbojet heats up, given the difference in expansion between the first cheekplate 27 with the vanes 26 and the outer casing 32. This clearance J decreases with increasing temperature of the turbojet until it becomes zero or even negative, with the vanes 26 coming into contact with the coating 33. Since the coating 33 has the ability to deform, it damps stresses between the vanes 26 and the casing 32, thereby protecting the vanes and the casing. Nevertheless, the contact between the vanes 26 and the coating 33 should preferably be relatively gentle to avoid running the risk of damaging the vanes 26 or the casing 32.

When the clearance J is zero or negative, in theory there is no leakage of air between the vanes 26 and the coating 33, with the vanes 26 bearing dynamically against the coating 33.

When hot, with the operating temperature of the diffuser varying, the tips of the vanes 26 move relative to the coating 33. Since the coating 33 is elastically deformable, it "follows" the tips of the vanes 26 as they move away from the casing so that leaks of air between these portions remain limited whatever the operating speed of the turbomachine.

As examples of abradable material suitable for constituting the abradable coating 33, mention may be made of:

mineral-filled epoxy abradable coatings, e.g. the material sold under the name "RCM1";

aluminum, silicon, and non-fused polyester abradable coatings, and for example the materials sold under the name "Metco 601 NS" or "Amdry 950"; and cobalt-nickel-chromium-aluminum-yttrium-polyester and boron nitride abradable coatings, and for example the material sold under the name "Metco SM 2043 NS".

The outer casing 32 presents a shoulder 36 against which the outer downstream edge 37 of the intermediate portion 24 comes into abutment during assembly of the diffuser. The shoulder 36 is thus used as a reference and as a guide to properly positioning the intermediate portion 24.

Still for the purpose of making it easier to position the intermediate portion 24, the outer wall 39 of the intermediate portion 24 bears against the outer casing 32, the bearing interface 35 between the outer wall 39 and the casing being a circularly cylindrical surface of significant axial width.

Figure 6:
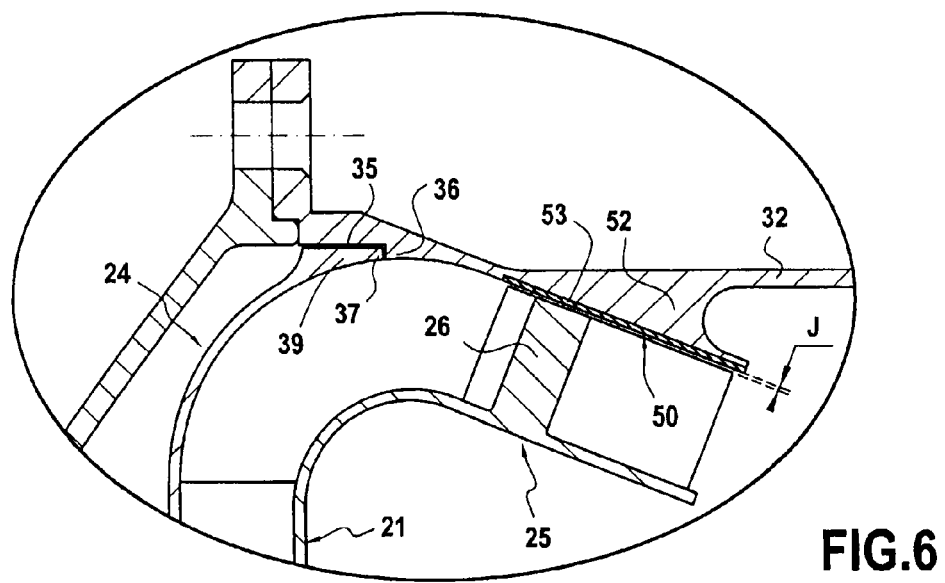
FIG. 6 shows a detail of the FIG. 5 diffuser.
Figure 5:
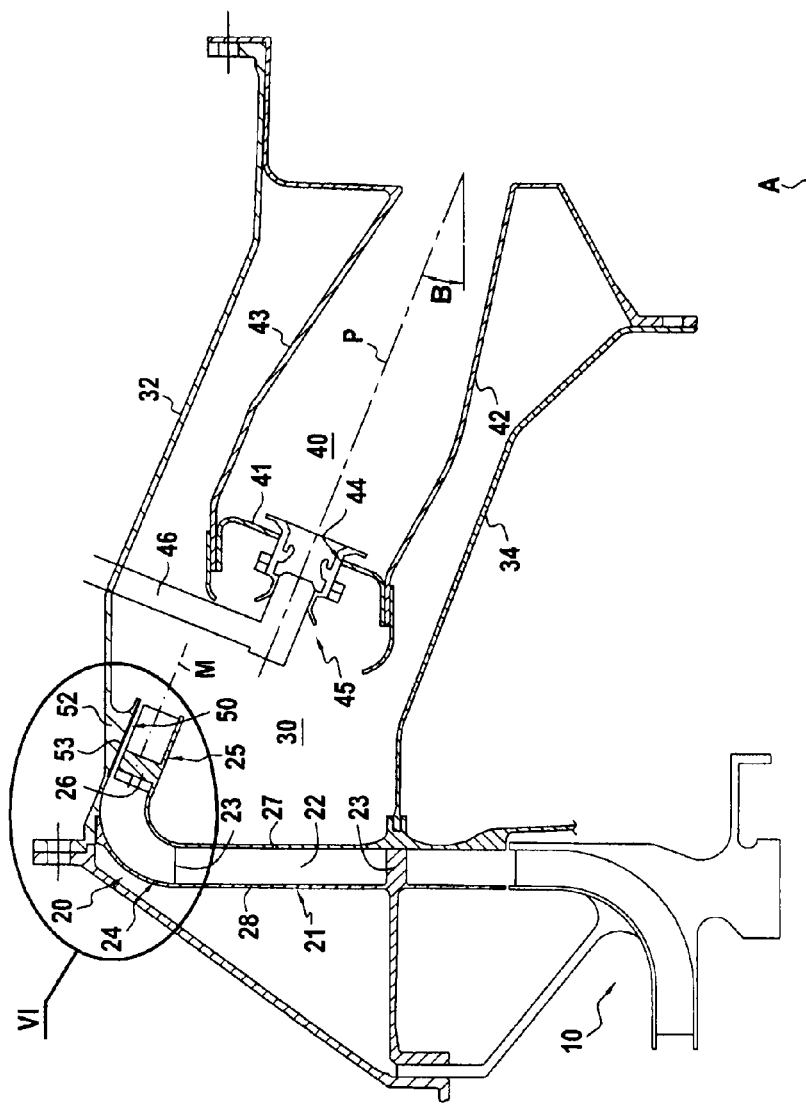
FIG. 5 is a diagrammatic axial half-section view showing the compressor, the diffuser, and the combustion chamber module of another example of an airplane turbojet, in accordance with the invention.

With reference to FIGS. 5 and 6, there follows a description of another example of a turbojet of the invention. Elements that are analogous between this example and the example of FIGS. 3 and 4 are given the same numerical references.

This turbojet differs from that of FIGS. 3 and 4 in that the downstream portion 25 of the diffuser is inclined relative to the axis A of the turbomachine towards the combustion chamber 40, such that in a section plane containing the axis A of the turbomachine, the mean axis M of the flow passage at the outlet from the downstream portion 25 of the diffuser forms a non-zero acute angle A relative to the axis, said mean axis M preferably intersecting the combustion chamber end wall 41.

Such an inclination of the downstream portion 25 of the diffuser 20 relative to the axis A of the turbomachine serves to reduce head losses in the gas between the outlet of the diffuser 20 and the combustion chamber 40. It also serves to feed gas in more symmetrical manner to the inner and outer zones bypassing the chamber 40, and also to feed gas better to the inner bypass zone. Furthermore, the feed of gas to the injector systems 45 is also more symmetrical.

In this example, the outer casing 32 presents a frustoconical inner surface portion 50 facing the deflector vanes 26. This surface portion 50 is covered in an abradable coating 53. This coating 53 presents the same properties and advantages as the abradable coating 33 of FIGS. 3 and 4. The frustoconical surface portion 50 and its coating 53 fit closely to the outline of the deflector vanes 26 (ignoring the clearance J). In this example, the frustoconical surface portion 50 is implemented as a portion 52 of extra thickness of the outer casing 32.

The invention claimed is:

1. A turbomachine comprising:
an annular combustion chamber;
a centrifugal compressor;
an annular diffuser serving to diffuse the gas stream leaving the compressor and to direct the gas stream towards the combustion chamber, the diffuser comprising: a radially oriented upstream portion presenting diffusion passages connected to an outlet of the compressor; a curved intermediate portion; and a downstream portion having a series of circularly spaced-apart deflector vanes; and an outer casing externally surrounding the combustion chamber and the downstream portion, wherein an inside wall of the upstream portion, the intermediate portion, and the downstream portion are continuously defined by a first cheekplate, an outer wall of the upstream portion and the intermediate portion are continuously defined by a second cheekplate, and the first and second cheekplates define a flow passage in the upstream and intermediate portions and are separate from the outer casing, wherein a portion of the outer casing near an upstream end thereof presents a radial shoulder which axially abuts against a downstream end of the second cheekplate defining the outer wall of the intermediate portion, wherein a zone of the outer casing that is situated facing the deflector vanes of the downstream portion is covered by a coating of abradable material, wherein an outside of a flow passage through the downstream portion is defined by the outer casing and by said coating and an inside of the flow passage through the downstream portion is defined by the first cheekplate, and wherein the downstream end of the second cheekplate presents a cylindrical surface which abuts against an inner cylindrical surface of the portion of the outer casing, the inner cylindrical surface being radially offset from the zone of the outer casing covered by the coating by at least a radial dimension of the shoulder.

2. A turbomachine according to claim 1, wherein said coating is made of a material selected from: a mineral-filled epoxy abradable material; an aluminum, silicon, and non-fused polyester abradable material; and a cobalt-nickel-chromium-aluminum-yttrium-polyester and boron nitride abradable material.

3. A turbomachine according to claim 1, wherein the deflector vanes present respective free outer ends.

4. A turbomachine according to claim 1, wherein, when cold, there exists clearance between the deflector vanes and the coating.

5. A turbomachine according to claim 1, wherein the outer casing presents a frustoconical inside surface portion facing the deflector vanes, said surface portion being covered by said coating.

6. A turbomachine according to claim 1, wherein said first cheekplate carries the deflector vanes.

7. A turbomachine according to claim 1, wherein the upstream portion includes a series of circularly spaced-apart diffusion vanes, carried by the second cheekplate, that form said diffusion passages between one another, and wherein the first cheekplate is brazed to said diffusion vanes.

8. A turbomachine according to claim 1, wherein the downstream portion is free of any outer bushing.

9. A turbomachine according to claim 1, wherein said coating of abradable material is configured to protect said casing and to deform so as to damp mechanical stresses exerted by the deflector vanes on the casing.

10. A turbomachine according to claim 9, wherein said coating of abradable material is configured to deform elastically in an operating temperature range of the diffuser and to return to an original shape when said vanes move away from the casing thereby limiting a clearance between tips of said vanes and said casing.

* * * * *